United States Patent
Darsin et al.

(10) Patent No.: US 7,292,679 B2
(45) Date of Patent: Nov. 6, 2007

(54) METHOD AND A SYSTEM FOR SUBMITTING MESSAGES DEPOSITED IN AN INBOX OF A MESSAGING SERVICE

(75) Inventors: Bruno Darsin, Viroflay (FR); Thierry Rouge, Pleumeur Bodou (FR); Arnaud Brun, Boulogne Billancourt (FR)

(73) Assignee: France Telecom, Paris (FR)

( * ) Notice: Subject to any disclaimer, the term of this patent is extended or adjusted under 35 U.S.C. 154(b) by 0 days.

(21) Appl. No.: 10/893,937

(22) Filed: Jul. 20, 2004

(65) Prior Publication Data

US 2005/0018821 A1 Jan. 27, 2005

(30) Foreign Application Priority Data

Jul. 24, 2003 (EP) .................................. 03291835

(51) Int. Cl.
H04M 1/64 (2006.01)
(52) U.S. Cl. ................................ 379/88.12; 379/88.13; 379/88.19; 379/93.35; 709/220; 348/14.02
(58) Field of Classification Search ............. 379/93.35, 379/93.25, 142, 88.13, 88.14, 88.19, 88.12; 709/220; 348/14.02
See application file for complete search history.

(56) References Cited

U.S. PATENT DOCUMENTS

| | | | | |
|---|---|---|---|---|
| 5,426,460 A | * | 6/1995 | Erving et al. ............. | 348/14.02 |
| 6,052,444 A | * | 4/2000 | Ferry et al. ............... | 379/93.35 |
| 6,621,892 B1 | * | 9/2003 | Banister et al. .......... | 379/88.14 |
| 6,804,335 B1 | * | 10/2004 | Kugell .................... | 379/88.19 |
| 6,804,708 B1 | * | 10/2004 | Jerding et al. ............. | 709/220 |
| 2004/0120477 A1 | * | 6/2004 | Nguyen et al. .......... | 379/88.19 |
| 2004/0165703 A1 | * | 8/2004 | Jones ....................... | 379/88.13 |

FOREIGN PATENT DOCUMENTS

| WO | 00/59196 | 10/2000 |
|---|---|---|
| WO | 02/052881 | 7/2002 |

OTHER PUBLICATIONS

"3rd Generation Partnership Project; Technical Specification Group Terminals; Multimedia Messaging Service (MMS); Functional description; Stage 2 (Release 5)", 3GPP TS 23 140 V5.7.0, Jun. 2003, pp. 1-157, XP002266352, URL:http://www.3gpp.org/ftp/Specs/archive/23_series/23.140/23140-570.zip>.

* cited by examiner

*Primary Examiner*—Gerald Gauthier
(74) *Attorney, Agent, or Firm*—Young & Thompson

(57) ABSTRACT

A system and a method for submitting a message (MSG) to a telecommunications terminal (2) of an addressee, which message has been deposited by a caller in an inbox (12) of a messaging server (1) of the addressee. The method comprises the following successive steps:

a step of sending a request to search for an illustration (8) from the voice messaging server (1) to a directory device (3), a step of sending said illustration (8) from the directory device (3) to the messaging server (1), a step of sending the deposited message (MSG) and said illustration (8) from the messaging server (1) to a multimedia messaging server centre (MMSC), and a step of sending a multimedia message (MMS) containing at least said deposited message (MSG) and said illustration (8) from the multimedia messaging server centre (MMSC) to the terminal (2).

3 Claims, 2 Drawing Sheets

METHOD AND A SYSTEM FOR SUBMITTING MESSAGES DEPOSITED IN AN INBOX OF A MESSAGING SERVICE

The present invention relates to a method of submitting to a telecommunications terminal a message deposited in an inbox of a messaging service and to a submission system associated with the method.

BACKGROUND OF THE INVENTION

Messaging services are very widespread in the field of telecommunications.

In particular, the multimedia message service is used to send and receive large messages containing pictures, sounds, text, or video. The multimedia messaging service is provided by a multimedia messaging server enabling the sending and receiving of multimedia messages by any device, usually called an MMS client, comprising means for communicating with the multimedia messaging server and means for composing and reading multimedia messages. This service may be deployed on a mobile network, for example a GSM, GPRS, or UMTS mobile network, or on a fixed, cable or other, network.

Many mobile and fixed operators offer their subscribers a directory service that is complementary to messaging services and usually enables users to store an address book containing multiple information on each contact (name, photo, address, telephone number, etc.).

Most operators offer their subscribers a voice messaging service. If a user subscribing to this service is not available, for example if his terminal is switched off or outside the network coverage area, if his line is busy, if incoming calls are forwarded unconditionally to the voice messaging service, or if the user declines to take the call, the caller has the option to record a voice message in a voice mailbox of the subscriber. The messaging service then notifies the user that there is a new message in his voice mailbox.

The notification of the reception of a new message may take various forms, in particular text or voice form.

If the notification is in text form, it may be given by sending an SMS message or an electronic mail message. SMS messages are received on the user's mobile or fixed telephone. Electronic mail messages may be read on a computer or a personal digital assistant (PDA) via an Internet site or on a WAP mobile terminal.

A new message in an inbox may also be notified by a telephone call or by sending a voice notification to a fixed telephone. In which case, the subscriber hears a specific tone on picking up the handset or sees on the handset a visual indication of a new message in the voice inbox. Messages that have been left may be consulted directly from the user's own telephone or indirectly from any telephone.

However, no existing notification mode includes the voice message itself in the notification sent to the addressee terminal. Existing notification means merely notify the existence of a message, but the message cannot be listened to or read. Consequently, after receiving a notification message indicating that there is a new message in his voice box, the subscriber must then call his voice messaging service to listen to the message.

OBJECTS AND SUMMARY OF THE INVENTION

An object of the present invention is to improve message notification modes, and in particular to make them more user-friendly.

Moreover, no existing messaging service or directory service enables users to receive an illustration at the same time as a voice message.

To alleviate the shortcomings of the notification services of existing messaging systems, the present invention proposes a method of submitting a message to a telecommunications terminal belonging to an addressee, which message has been deposited by a caller in an inbox of a messaging server of the addressee, the method comprising the following successive steps:

a first step of sending a request to search for an illustration from the voice messaging server to a directory device, a second step of sending said illustration from the directory device to the messaging server, a third step of sending the deposited message and said illustration from the messaging server to a multimedia messaging server centre, and a fourth step of sending a multimedia message containing at least said deposited message and said illustration from the multimedia messaging server centre to the terminal of said addressee for direct consultation thereof on the telecommunications terminal of the addressee.

By means of this method, the subscriber obtains the voice message and an illustration characteristic of the caller directly on his telecommunications terminal.

The invention simplifies how the user accesses messages and makes the standard messaging services more user-friendly. It also identifies the caller in an engaging and direct manner.

Particular embodiments of the method of submitting a message have one or more of the following features:

the illustration is characteristic of the caller and the illustration search request contains means for identifying the caller;

the messaging server is a voice messaging server, the deposited message containing voice data;

the method further comprises a step of searching for the illustration in a database of the directory device on the basis of said identification means and a step of processing the deposited message and the illustration by the multimedia messaging server centre to include them in a multimedia message;

the method includes a preliminary step of storing the caller identification means and an illustration associated with said identification means in the database of the directory device;

the illustration characteristic of the caller comprises a photo or a logo;

the illustration is replaced by a specific illustration if there is no stored illustration associated with the caller in the database;

the illustration is replaced by an alternative illustration characteristic of communication in a secret mode if the caller has activated a calling line offering refusal mode;

the deposited message also contains text data;

the method further comprises a step of analyzing the deposited message and/or the inbox, done by a processing unit of the messaging server to establish information relating to said message or messages, the second sending step also comprises sending the information relating to said message or messages, and the processing step comprises a step of introducing said information into said multimedia message;

the method further comprises a step of storing the deposited message and the illustration in the inbox of the messaging server if the terminal of the addressee cannot be contacted;

the illustration comprises the logo of an operator or a promotional image.

The invention also proposes a system for submitting a message deposited by a sender in an inbox of a messaging server of an addressee equipped with a telecommunications terminal, the system comprising:

in said messaging server:

a communications interface to a multimedia messaging server centre for transmitting said deposited message to said multimedia messaging server centre, and in the telecommunications terminal of the addressee:

a communications interface with said multimedia messaging server for receiving said multimedia message) containing said deposited message, a multimedia message multimedia client module for reproducing said deposited message directly on said telecommunications terminal.

Particular embodiments of the system for submitting a message have one or more of the following features:

the messaging server is adapted to communicate with a directory device to request an illustration associated with the caller, said directory device comprising a database comprising storage spaces adapted to store illustrations and means for searching for an illustration in said database on the basis of identification means sent by the messaging server;

the telecommunications network is a mobile telephone network and/or a fixed telephone network;

the communications interface of the messaging server is an XML interface and the system includes a gateway server for converting the communications protocol into a protocol readable by the multimedia message server centre.

BRIEF DESCRIPTION OF THE DRAWINGS

The following description, which is given by way of non-limiting example, describes the invention in more detail with reference to the appended drawings, in which.

MORE DETAILED DESCRIPTION

The method and the system of the invention for submitting a message are described below in an application to a voice messaging server. However, they could equally be applied to a text or picture messaging server. In this case, messages could comprise a weather map or a newspaper article, for example.

Figure 1:
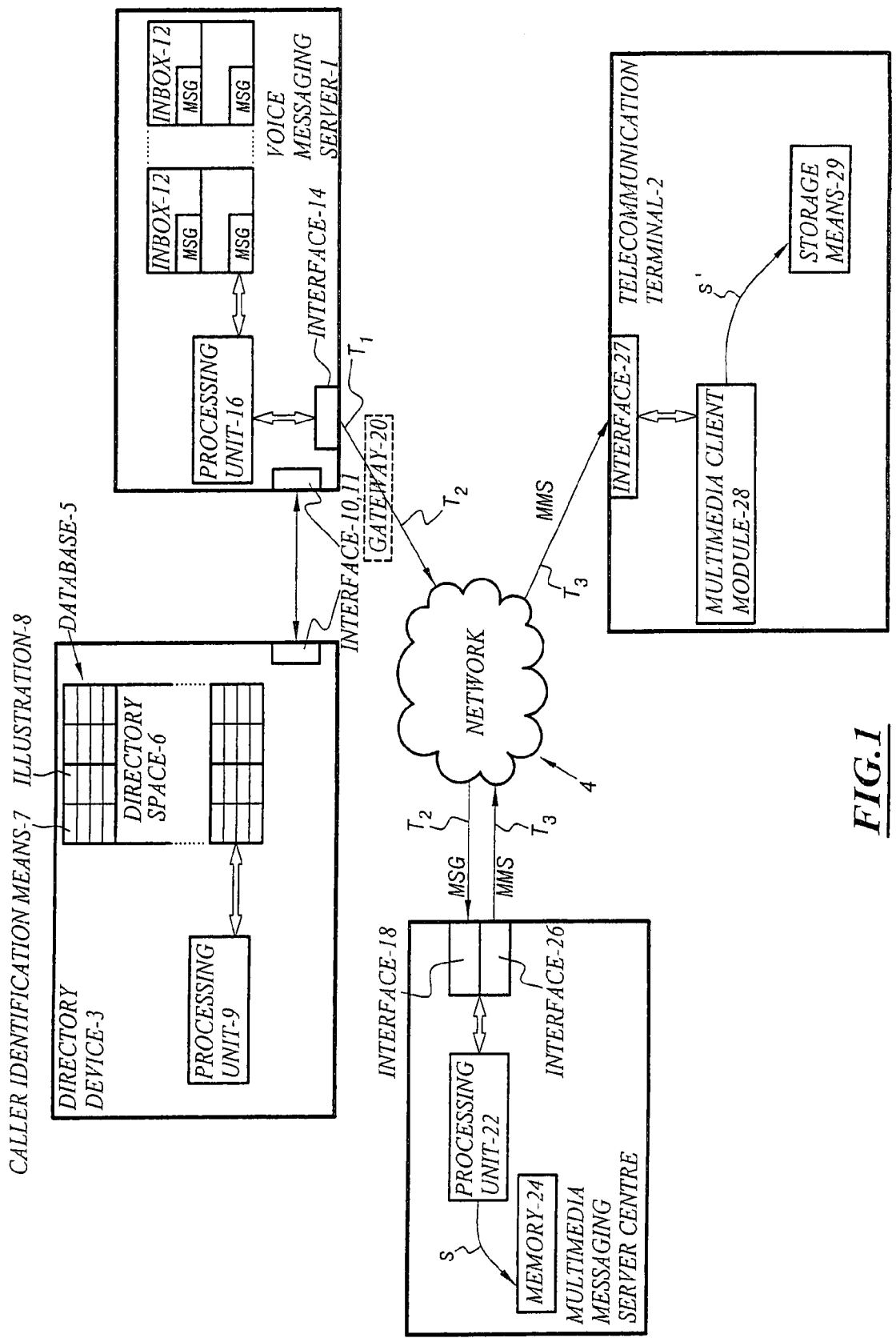
FIG. 1 is a diagram of a system of the invention for submitting a message deposited in an inbox of a messaging server.
Figure 2:
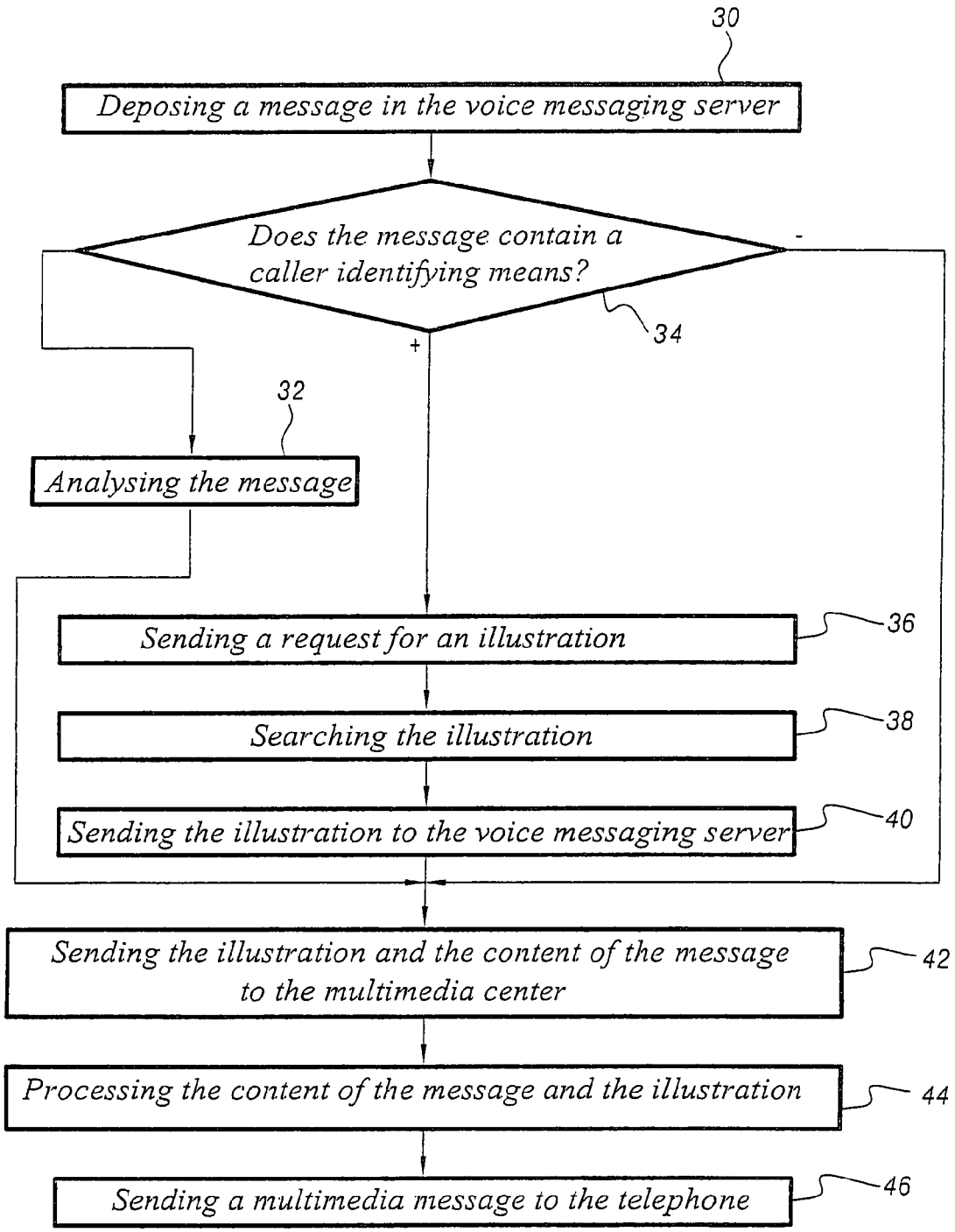
FIG. 2 is a flowchart of the principal steps of a method of the invention of submitting a message.

The system for submitting a message depicted in FIG. 1 comprises a voice messaging server 1, a telecommunications terminal 2 of an addressee who is a subscriber of the messaging server 1, a directory device 3 and a multimedia messaging server centre MMSC. The voice messaging server 1, the multimedia messaging server centre MMSC and the communications terminal 2 exchange data via a telecommunications network 4.

The directory device 3 comprises a database 5 divided into a plurality of directory storage spaces 6 each reserved for one subscriber. Each directory space 6 comprises caller identification means 7 that may give a caller's mobile and fixed telephone numbers, address, building code, etc.

Each directory storage space 6 further comprises illustrations 8 representing or evoking the callers listed in the addressee's address book. These illustrations consist of a photo of a caller, a logo or a picture, each of which evokes the caller.

The directory server 3 further comprises a processing unit 9 and a communications interface 10 for communicating with the voice messaging server 1.

At the request of the voice messaging server 1, the directory device 3 is able to search the addressee's storage space 6 for an illustration 8 associated with the caller and send that illustration 8 to the voice messaging server 1 via the communications interfaces of the directory server 10 and the messaging server 11.

In the example depicted in FIG. 1, the directory device 3 is hosted on an independent server and communicates with the voice messaging server 1 via the communications interfaces 10 and 11. However, the directory device 3 could equally be hosted directly on the voice messaging server.

The voice messaging server 1 comprises a set of message inboxes 12, a communications interface 14 with the telecommunications network 4, a communications interface 11 with the directory server 3, and a processing unit 16.

Each inbox 12 is dedicated to a particular addressee and is identified by identification means such as the user's telephone number.

The processing unit 16 of the messaging server 1 is adapted to manage messages (MSG) deposited in the addressees' inboxes 12.

In particular, the processing unit 16 is adapted to send the directory device 3 a request to search for an illustration characteristic of a caller.

Also, the processing unit 16 is adapted to send to a multimedia messaging server centre MMSC voice messages MSG deposited in the inboxes 12 and illustrations 8 sent by the directory server 3.

Moreover, the processing unit 16 is adapted to process an "information" function. This function may be activated or deactivated at the command of the operator of the voice messaging server 1 or at the command of the subscriber, for example by sending an MMS or SMS message.

When this function is activated, the processing unit 16 of the messaging server 1 analyses the received messages (MSG) and establishes information relating to the messages and/or to the inbox 12. The information may comprise, for example, the caller's telephone number, the date and time at which the message was received, the size of the message received, the number of messages stored in the inbox, or the percentage of memory therein that remains unallocated.

When the information function is activated, the processing unit 16 of the voice messaging server 1 is adapted to introduce text information concerning received messages, the received voice message MSG and the illustration 8 into a single message to send them to the multimedia messaging server centre MMSC.

The messaging server 1 comprises a communications interface 14 for dialogue with a multimedia messaging server centre MMSC. Different types of interfaces may be used.

Thus a first example of an interface uses an electronic mail notification service already available on certain fixed and mobile voice messaging systems. In this case, an electronic mail message is sent directly (T1, T2) to an interface 18 of the multimedia messaging server centre MMSC. The electronic mail message has an attachment consisting of the caller's voice message MSG and an illustration 8 associated with the caller who deposited the message, and where applicable information relating to the message or to the inbox. The electronic mail notification services are adapted to dialogue with an MM3 interface at the level of the multimedia messaging server centre MMSC. The MM3 interface is generally used between a multimedia messaging server centre and external messaging systems. It is not standardized, but examples using SMTP are indicated in the standards defined in the Technical Specification MMS 3GPP TS 23.140: "Annexe A: Exemples d'implémentations d'architectures MMS" ["Appendix A: Examples of implementations of MMS architectures"].

Similarly, a second example of this kind of interface uses an XML library, also already available on certain voice messaging systems. As XML libraries communicate in HTML protocol and use HTTP language, the voice message MSG and the illustration 8 are first sent to an intermediate gateway 20 to convert the message to SMTP protocol so that it may be processed by the MM3 interface of the multimedia messaging system. The message is then sent (T2) to the multimedia messaging server centre MMSC. The functional richness of the XML library enriches the service provided by adding the possibility of managing messages, for example deleting a voice message directly after its transfer to the multimedia messaging server centre MMSC.

A third example uses an MM7 interface. An MM7 interface is conventionally used between a multimedia messaging server MMS and added value server providers. It is standardized and based on the SOAP protocol.

The multimedia messaging server centre MMSC has a communications interface 18 to the voice messaging server 1, a message processing unit 22, a memory 24 and a communications interface 26 to the addressee's terminal 2.

As described above, the communications interface 18 with the voice messaging server 1 is an MM3 or MM7 interface.

The data storage means or memory 24 are adapted to store temporarily voice messages, illustrations and, where applicable, text data sent by the messaging server 1.

The processing unit 22 is adapted to include the deposited voice message MSG, the illustration 8 and where applicable the text data in an MMS multimedia message.

The multimedia messaging server centre MMSC is adapted to send to the addressee's telecommunications terminal 2 a multimedia message MMS containing the voice message MSG, the illustration 8 and where applicable the text data.

The communications interface 26 is an MM1 interface adapted to communicate with a multimedia client module 28 of the communications terminal 2.

The user's telecommunications terminal 2 comprises a communications interface 27 with the multimedia messaging server centre MMSC, a multimedia client module 28 and data storage means 29.

The communications interface 27 with the multimedia messaging server centre MMSC is preferably an MM1 interface.

The multimedia client module 28 constitutes means for communicating with a multimedia messaging server centre MMSC and means for composing, reading and presenting multimedia messages MMS.

Moreover, it is adapted to manage multimedia messages in the terminal. Accordingly, the multimedia client module 28 allows the addressee to save multimedia messages in his terminal, listen to them again, delete them, or even forward them to another user.

The communications interfaces 10, 11, 14, 18, 26, 27 and the processing units 9, 16, 22 of the voice messaging server 11 of the directory server 3 and of the multimedia messaging server centre and the multimedia client module 28 may be implemented in hardware on a microcontroller or in software on a software medium or a programmed component executed from non-volatile memory by a microprocessor.

The data storage means 29 comprise a non-volatile read only memory (ROM), an electrically erasable programmable read only memory (EEPROM) or the like. Their capacity is used to store multimedia messages and may typically be of the order of 500 kilobytes or more.

The steps of the method of submitting a message are described next.

The process of submitting a message begins with a step 30 of receiving a message MSG from a caller in the inbox 12 of an addressee subscribing to the voice messaging service.

If the "information" function is activated, the processing unit 16 of the voice messaging server 1 analyses the message during a step 32 and establishes information concerning it and/or the addressee's inbox 12.

In parallel with this, in a step 34, the processing unit 16 of the voice messaging server 1 verifies if the deposited message MSG contains means 7 for identifying the caller, for example his telephone number.

Alternatively, if there are no means 7 for identifying the caller, for example if the caller has barred caller identification by activating a calling line number offering refusal mode, the processing unit 16 searches the inbox 12 of the messaging server 1 for a specific illustration characteristic of a secret communications mode.

The illustration was stored beforehand either by the addressee or by the operator of the messaging service 1.

Alternatively, the illustration is stored in the storage space 6 of the directory device 3.

Alternatively, if there are no identification means, the illustration 8 is replaced by a particular code that is also characteristic of the use by the caller of a secret mode.

If the means 7 for identifying the caller are present, in a step 36 the processing unit 16 of the voice messaging server 1 sends the directory server 3 a request to search for an illustration. The request contains the means 7 for identifying the caller and means for identifying the addressee who is the proprietor of the directory space 6.

On receiving this request, during a step 38, the processing unit 9 of the directory server 3 identifies the addressee's directory space 6 using the means for identifying the addressee and searches the directory space 6 for the illustration 8 associated with the caller identification 7.

Then, during a step 40, the processing unit 9 of the directory server 3 sends the illustration 8 associated with the caller to the voice messaging server 1 via the communications interfaces 10 and 11.

However, if no specific illustration has been stored for the caller, the processing unit 9 of the directory server 3 sends a specific illustration informing the subscriber that there is no illustration associated with the caller. This specific illustration is stored beforehand either by the addressee or by the operator of the messaging server 1.

During a step 42 the messaging server 1 transmits (T1, T2) the voice message MSG deposited in the inbox 12, the illustration 8 associated with the caller and, if the "information" function has been activated, information relating either to the message MSG or to the inbox 12 to the multimedia messaging server centre MMSC via the communications interface 14 and the telecommunications network 4. Thus voice, picture and where applicable text data are combined in a single message and sent to the multimedia messaging server centre.

During a step 44, the processing unit 22 of the multimedia messaging server centre MMSC processes the deposited voice message MSG, the illustration 8 associated with the caller, and where applicable the information relating either to the message deposited or to the inbox 12, in order to introduce them into a single multimedia message MMS.

Finally, during a step 46, the multimedia message MMS is sent to the addressee's telecommunications terminal 2.

Thus the invention enables the addressee to receive directly on his telecommunications terminal 2 the voice message MSG that the caller has deposited in the inbox 12 of his voice messaging system 1 and an illustration 8 characteristic of the caller.

The multimedia message MMS is temporarily stored S in a memory 29 of the multimedia messaging server centre MMSC. The multimedia messaging server centre MMSC deletes the multimedia message from its memory 29 as soon as it has been sent successfully to the telecommunications terminal 2.

Moreover, in order to prevent the user being informed twice of the reception of the same voice message, it is preferable for the voice messaging server 1 not to send another notification of the presence of a message in the usual way.

In a preferred embodiment of the invention, the subscriber is able to activate or deactivate the sending of multimedia voice messages. Access to activation/deactivation management may be obtained:

- by means of a voice call on the line that is the proprietor of the voice box,
- by sending an SMS or MMS message on the line that is the proprietor of the voice box,
- by world wide web or WAP access to enable the user to modify his notification options,
- by using two USSD codes dedicated to notification activation/deactivation.

The voice message MSG stored in the inbox 12 of the addressee may be retained in the messaging server 1 after it is forwarded to the multimedia messaging service centre MMSC. In this case, consultation of the message on the voice messaging server may still be offered. Thus if the telecommunications terminal 2 cannot be contacted, the user may nevertheless consult the message stored in the inbox 12.

When the user's communications terminal 2 receives the multimedia message, the MMS client module may advantageously store it in its memory 29 during a step S'.

Alternatively, the illustration characteristic of the caller is replaced by a promotional image such as the logo of the operator, for example.

This service for submitting messages using a multimedia messaging service may be offered by an operator to all subscribers having a terminal incorporating an MMS client module.

This invention may be applied to a fixed telephone network or to a mobile telephone network.

What is claimed is:

1. A method of submitting a message to an addressee's telephone, comprising:
    when sending a message from a first caller to a first addressee in a system comprising a voice messaging server, an addressee telephone subscribing to the voice messaging server, a directory device, and a multimedia messaging server center exchanging data via a telecommunications network,
    the directory device comprising a database divided into a plurality of addressee storage spaces, each addressee storage space being for one subscriber of plural subscribers of the voice messaging server,
    each addressee storage space comprising a subscriber address book of plural callers and identification of each caller including an illustration representing each caller,
    a first step of depositing the message, from the first caller to the first addressee, in an inbox of the first addressee in the voice messaging server,
    a second step of sending, from the voice messaging server to the directory device, a request to have the directory device search a first addressee storage space for an illustration associated with the first caller, the search providing a first caller illustration;
    a third step of sending, from the directory device to the voice messaging server, the first caller illustration;
    a fourth step of sending the content of the deposited message and the first caller illustration from the voice messaging server to the multimedia messaging server center; and
    a fifth step of sending, from the multimedia server to a telephone of the first addressee, a multimedia message comprising the content of the deposited message, unconverted, combined with the first caller illustration, the multimedia message configured for direct consultation on the telephone of the first addressee.

2. The method of claim 1, wherein the deposited message is a voice message, the caller illustration is a photo, and the multimedia message comprises the voice message combined with the photo.

3. The method of claim 2, wherein, in each addressee storage space, the subscriber address book of plural callers further comprises identification of each caller including identification of each callers' mobile and fixed telephone numbers, address, and building code.

* * * * *